US008183302B2

(12) United States Patent
Klesczewski et al.

(10) Patent No.: US 8,183,302 B2
(45) Date of Patent: May 22, 2012

(54) VISCO-ELASTIC POLYURETHANE FOAM WITH CASTOR OIL

(75) Inventors: Bert Klesczewski, Köln (DE); Sebastien Triouleyre, Köln (DE); Matthäus Gossner, Köln (DE); Sven Meyer-Ahrens, Leverkusen (DE); Alice Mosbach-Rosenberger, Odenthal (DE)

(73) Assignee: Bayer MaterialScience AG, Leverkusen (DE)

( * ) Notice: Subject to any disclaimer, the term of this patent is extended or adjusted under 35 U.S.C. 154(b) by 121 days.

(21) Appl. No.: 12/390,629

(22) Filed: Feb. 23, 2009

(65) Prior Publication Data
US 2009/0264547 A1 Oct. 22, 2009

(30) Foreign Application Priority Data

Feb. 27, 2008 (DE) .......................... 10 2008 011 459
Mar. 13, 2008 (DE) .......................... 10 2008 014 032

(51) Int. Cl.
*C08G 18/28* (2006.01)
(52) U.S. Cl. .............. 521/174; 252/182.25; 252/182.27; 521/130; 521/159; 521/170
(58) Field of Classification Search .................. 521/159, 521/130, 170, 174; 252/182.25, 182.27
See application file for complete search history.

(56) References Cited

U.S. PATENT DOCUMENTS

| 4,263,408 | A | 4/1981 | Meyborg et al. |
| 4,839,397 | A | 6/1989 | Lohmar et al. |
| 5,420,170 | A | 5/1995 | Lutter et al. |
| 6,136,879 | A | 10/2000 | Nishida et al. |
| 6,653,363 | B1 | 11/2003 | Tursi, Jr. et al. |
| 2002/0165290 | A1 | 11/2002 | Falke et al. |
| 2006/0270747 | A1 | 11/2006 | Griggs |
| 2009/0170972 | A1* | 7/2009 | Sonney et al. .................. 521/88 |

FOREIGN PATENT DOCUMENTS

| CA | 2213564 A1 | 2/1998 |
| DE | 2832253 A1 | 1/1980 |
| DE | 3316652 A1 | 12/1984 |
| DE | 3708961 A1 | 10/1988 |
| EP | 0826706 A2 | 8/1997 |
| WO | WO-01/25305 A1 | 4/2001 |
| WO | WO-01/32736 A1 | 5/2001 |
| WO | WO-02/077056 A1 | 10/2002 |
| WO | WO-02/088211 A1 | 11/2002 |
| WO | WO-2007/085548 A1 | 8/2007 |

* cited by examiner

*Primary Examiner* — John Cooney
(74) *Attorney, Agent, or Firm* — Connolly Bove Lodge & Hutz LLP

(57) ABSTRACT

The present invention relates to polyether polyol compositions containing renewable raw materials, a process for preparing visco-elastic polyurethane foams using such compositions, correspondingly prepared visco-elastic foam materials, and the use thereof.

19 Claims, No Drawings

VISCO-ELASTIC POLYURETHANE FOAM WITH CASTOR OIL

RELATED APPLICATIONS

This application claims benefit to German Patent Application Nos. 10 2008 011 459.6, filed Feb. 27, 2008, and 10 2008 014 032.5, filed Mar. 13, 2008, which are incorporated herein by reference in their entireties for all useful purposes.

BACKGROUND OF THE INVENTION

Visco-elastic foams are characterized by a slow and gradual recovery after compression. Such materials are well known in the prior art and are much appreciated because of their energy-absorbing properties. Visco-elastic foam materials are found in a wide variety of application fields for cushioning (for example, in pillows, seat covers, mattresses etc.), as sound- and/or vibration-damping materials or as an impact protection.

Among the visco-elastic foam materials, those made of polyurethanes are certainly of the greatest importance. On the one hand, this is due to the fact that the physical properties of the polyurethane foam to be obtained can be adjusted very exactly by selecting the polyol and isocyanate components employed and optionally other auxiliaries, and on the other hand, it is also because foam materials of almost any shape and structure, which may be very complex, can be prepared by the "in situ" preparation (optionally on location).

During the preparation of polyurethanes, usually two or more liquid streams are combined. The mixing of these liquid streams initiates polymerization and, as the case may be, the foaming of the polymerizing material. The polymerization and shaping are often effected in one step, typically by shaping or spraying the reaction mixture while still in a liquid state. In addition, polyurethanes are also often prepared in the form of slabstock, which is subsequently cut to the desired shape.

In most cases, the above mentioned liquid streams are, on the one hand, a polyfunctional organic isocyanate component (often referred to as "component A") and, on the other hand, polyfunctional monomers or resins which have an appropriate reactivity towards isocyanates and may optionally contain further auxiliaries. The latter mixture, which is often referred to as "component B", typically comprises one or more polyol components for the major part thereof.

Now, to obtain a polyurethane foam of a particular composition, the above described liquid streams are dosed correspondingly before being mixed. Usually, foaming is achieved by adding water to component B, which water reacts with the polyisocyanate of component A to form an amine and to release $CO_2$, which in turn functions as a foaming gas. Alternatively or additionally to the use of water, volatile inert organic compounds or inert gases are often used.

The majority of conventional polyurethane foams are block copolymers comprising spatially separated regions of different phases with high and low glass transition temperatures ($T_G$). The glass transition temperature separates the brittle energy-elastic range (=glass range) below from the soft entropy-elastic range (=rubber-elastic range) above. These high and low glass transition temperatures of different phases within the polymer normally set limits to the temperature range within which the material can be used. The DMA ("dynamic mechanical analysis") spectra of such materials are usually characterized by a relatively flat region ("modulus plateau") between the different glass transitions.

The phase of low glass transition temperature in such materials is usually (though not always) derived from a "block" of low glass transition temperature, which is formed first and subjected to polymerization only subsequently. In contrast, the phase of high glass transition temperature normally forms only during the polymerization due to the formation of urethane moieties which occurs then. The block of low glass transition temperature (often also referred to as "soft block") is usually derived from a liquid or from an oligomeric resin of low melting temperature that contain a large number of groups reactive towards isocyanate moieties. Polyether polyols and polyester polyols are examples of such oligomeric resins.

In conventional polyurethanes, the hard (high glass transition temperature) and soft (low glass transition temperature) phases arrange towards one another during polymerization and subsequently separate spontaneously to form morphologically different phases within the "bulk polymer". Accordingly, such materials are also referred to as "phase-separated" materials.

In this context, visco-elastic polyurethanes are a special case in a way, namely in which the above described phase separation occurs incompletely or not at all.

To be distinguished from such a "structural visco-elasticity" in polyurethane foams with (predominantly) open cells is a visco-elasticity that is due to a pneumatic effect. Namely, in the latter case, almost closed cells, i.e., cells with little opening, are within the foam material. Because of the small size of the openings, air will re-enter slowly after compression, which results in a slowed-down recovery.

Examples of such a visco-elastic foam based on a pneumatic effect are the commercially available products Cosypur® and Elastoflex® of the Elastogran GmbH.

In the prior art, many methods have been described for the synthesis of polyurethane foams with structural visco-elasticity, which methods mostly share the use of a special polyether polyol composition in addition to an isocyanate component that is more or less freely selectable.

Such polyether polyols are usually the product of the polymerization of epoxides, such as ethylene oxide (EO), propylene oxide (PO), butylene oxide, styrene oxide or epichlorohydrin, with themselves or by addition of such epoxides, optionally in admixture or sequentially, to starting components with reactive hydrogen atoms, such as water, alcohols, ammonia or amines. Such "starter molecules" usually have a functionality of from 1 to 6. Depending on the process control, such polyether polyols may be homopolymers, block copolymers, random copolymers, capped polymers or polymers tipped with a mixture of different epoxides. To specify such polyether polyols, various characteristics have become established in the prior art:

i.) hydroxyl functionality, which depends on the starter molecule starting from which the polyether polyol is synthesized;

ii.) hydroxyl or OH number, which is a measure of the content of hydroxyl groups stated in mg of KOH/g;

iii.) when epoxides in which the ring opening causes the formation of different (i.e., primary or secondary) hydroxyl groups are used, on the one hand, the proportion of the respective epoxides in the polyether polyol is stated, and on the other hand, the proportion of primary or secondary hydroxyl groups based on the total number of hydroxyl groups present in the polyether polyol is stated;

iv.) the molecular weight ($M_n$ or $M_w$), which is a measure of the length of the polyalkylene chains of the polyether polyols.

The above mentioned quantities can be related to one another through the following equation: 56,100=OH number·($M_w$/hydroxyl functionality).

Examples of the use of polyether polyol compositions in polyurethane synthesis are found, for example, in WO 01/32736 A1, WO 02/088211 A1, WO 02/077056 A1, WO 01/25305 A1, U.S. Pat. No. 5,420,170, U.S. Pat. No. 6,653,363 B1 and U.S. Pat. No. 6,136,879 A.

A drawback of the examples stated above, which (almost) exclusively use polyether polyols as the B component, is the fact that a large amount of fossil raw materials must be provided for the synthesis thereof, and consequently, they cause a very high $CO_2$ emission (on the one hand, the epoxides are ultimately produced from compounds obtainable from petrol, mainly ethene and propene; on the other hand, a large amount of fossil raw materials is combusted for reacting petrol into the required intermediates ethene and propene).

Thus, under the aspect of renewability, a complete or at least partial replacement of the synthetic polyether polyols by substantially more readily accessible compounds and especially by renewable raw materials would be desirable. Approaches to achieving this object are found, for example, in EP 0826706 A2, DBP 1113810, DE 3708961 C2, DE 3316652 C2, U.S. Pat. No. 4,839,397 and US 2006/0270747 A1, which mainly teach the use of castor oil as a renewable raw material for the preparation of various polyurethane systems.

This concept gradually seems to enter the field of visco-elastic polyurethane foams as well, as shown in WO 2007/085548 A1. The invention described therein relates to a process for the preparation of open-pore visco-elastic polyurethane flexible foams based on renewable raw materials by reacting:
  a) polyisocyanates with
  b) a polyol mixture consisting of
    bi) compounds having at least two isocyanate-reactive hydrogens and an OH number of 20 to 100 mg of KOH/g; and
    bii) compounds having at least two isocyanate-reactive hydrogens and an OH number of 100 to 800 mg of KOH/g; and
    biii) compounds having at least one and at most two isocyanate-reactive hydrogens and an OH number of 100 to 800 mg of KOH/g; and
  c) foaming agents;
characterized in that each of components bi) and bii) contains at least one compound which contains renewable raw materials or their reaction products.

Castor oil is more preferably employed as compound bii). A drawback of this process is the fact that the main component, i.e. bi), is a reaction product of a renewable raw material with epoxides, i.e., is also a polyether polyol ultimately; in particular, a chemically unaltered renewable raw material cannot be exclusively employed here.

Therefore, it is the object of the present invention to provide a polyether polyol composition containing as high as possible a proportion of a chemically (almost) unmodified renewable raw material, which can be used to prepare polyurethane foams of high visco-elasticity.

EMBODIMENTS OF THE INVENTION

An embodiment of the present invention is a polyether polyol composition for use in preparing visco-elastic polyurethane foams, comprising: (a) a polyether polyol having a hydroxyl functionality of 3, an OH number in the range of from 210 to 255 mg of KOH/g and a PO content in the range of from 90 to 100% by weight; (b) a polyether polyol whose polyol starting molecule is not derived from a renewable raw material, having a hydroxyl functionality of 2, an OH number in the range of from 41 to 71 mg of KOH/g and a PO content in the range of from 90 to 100% by weight; (c) a polyether polyol having a hydroxyl functionality of 2, an OH number in the range of from 92 to 132 mg of KOH/g and a PO content in the range of from 90 to 100% by weight; and (d) at least one renewable raw material wherein each molecule of raw material has at least one free OH group.

Another embodiment of the present invention is the above polyether polyol composition, wherein the proportion of (a) in said polyether polyol composition is in the range of from 32 to 54% by weight.

Another embodiment of the present invention is the above polyether polyol composition, wherein the proportion of (b) in said polyether polyol composition is in the range of from 16 to 27% by weight.

Another embodiment of the present invention is the above polyether polyol composition, wherein the proportion of (c) in said polyether polyol composition is in the range of from 11 to 19% by weight.

Another embodiment of the present invention is the above polyether polyol composition, wherein the proportion of (d) in said polyether polyol composition is in the range of from 5 to 50% by weight.

Another embodiment of the present invention is the above polyether polyol composition, wherein said polyether polyol of (a) is derived from glycerol as the starter molecule.

Another embodiment of the present invention is the above polyether polyol composition, wherein said polyether polyol of (b) is derived from propylene glycol as the starter molecule.

Another embodiment of the present invention is the above polyether polyol composition, wherein said polyether polyol of (c) is derived from propylene glycol as the starter molecule.

Another embodiment of the present invention is the above polyether polyol composition, wherein said renewable raw material of (d) comprises castor oil and/or partially and/or completely hydrogenated castor oil.

Another embodiment of the present invention is the above polyether polyol composition, further comprising (e) a polyether polyol having a hydroxyl functionality of 2, an OH number in the range of from 450 to 550 mg of KOH/g and a PO content in the range of from 90 to 100% by weight.

Another embodiment of the present invention is the above polyether polyol composition, wherein said polyether polyol of (e) is derived from propylene glycol as the starter molecule.

Another embodiment of the present invention is the above polyether polyol composition, wherein the proportion of (e) in said polyether polyol composition is in the range of from 1 to 5% by weight.

Yet another embodiment of the present invention is a process for preparing a visco-elastic foam comprising reacting (a) a polyether polyol composition comprising (i) a polyether polyol having a hydroxyl functionality of 3, an OH number in the range of from 210 to 255 mg of KOH/g and a PO content in the range of from 90 to 100% by weight; (ii) a polyether polyol whose polyol starting molecule is not derived from a renewable raw material, having a hydroxyl functionality of 2, an OH number in the range of from 41 to 71 mg of KOH/g and a PO content in the range of from 90 to 100% by weight; (iii) a polyether polyol having a hydroxyl functionality of 2, an OH number in the range of from 92 to 132 mg of KOH/g and a PO content in the range of from 90 to 100% by weight; and (iv) at least one renewable raw material wherein each molecule of raw material has at least one free OH group; (b) a polyisocyanate component; and (c) optionally water and one or more catalysts; and optionally further auxiliaries, fillers, and/or foaming agents.

Another embodiment of the present invention is the above process, wherein the amount of polyisocyanate component is selected to have an isocyanate characteristic number within a range of from 70 to 120.

Another embodiment of the present invention is the above process, wherein the amount of polyisocyanate component is selected to have an isocyanate characteristic number within a range of from 85 to 105.

Another embodiment of the present invention is the above process, wherein a polyisocyanate component obtained by prepolymerization is employed.

Another embodiment of the present invention is the above process, wherein a polyether polyol composition comprising: (a) a polyether polyol having a hydroxyl functionality of 3, an OH number in the range of from 210 to 255 mg of KOH/g and a PO content in the range of from 90 to 100% by weight; (b) a polyether polyol whose polyol starting molecule is not derived from a renewable raw material, having a hydroxyl functionality of 2, an OH number in the range of from 41 to 71 mg of KOH/g and a PO content in the range of from 90 to 100% by weight; (c) a polyether polyol having a hydroxyl functionality of 2, an OH number in the range of from 92 to 132 mg of KOH/g and a PO content in the range of from 90 to 100% by weight; and (d) at least one renewable raw material wherein each molecule of raw material has at least one free OH group is employed in said prepolymerization.

Yet another embodiment of the present invention is a visco-elastic foam prepared by the above process.

Yet another embodiment of the present invention is a shaped body comprising the above visco-elastic foam.

Yet another embodiment of the present invention is a mattress, pillow, seat cover, shoe sole, earplug, protective clothing, protective equipment, or sound insulation comprising the above visco-elastic foam.

DESCRIPTION OF THE INVENTION

The present invention relates to polyether polyol compositions containing renewable raw materials, a process for preparing visco-elastic polyurethane foams using such compositions, correspondingly prepared visco-elastic foam materials, and the use thereof.

In a first embodiment, the object of the invention is achieved by a polyether polyol composition for the preparation of visco-elastic polyurethane foams comprising the following components:
(a) a polyether polyol having a hydroxyl functionality of 3, an OH number within a range of from 210 to 255 mg of KOH/g and a PO content within a range of from 90 to 100% by weight;
(b) a polyether polyol whose polyol starting molecule is not derived from a renewable raw material, having a hydroxyl functionality of 2, an OH number within a range of from 41 to 71 mg of KOH/g and a PO content within a range of from 90 to 100% by weight;
(c) a polyether polyol having a hydroxyl functionality of 2, an OH number within a range of from 92 to 132 mg of KOH/g and a PO content within a range of from 90 to 100% by weight; and
(d) at least one renewable raw material each having at least one free OH group per molecule of raw material.

The polyether polyols according to the invention are prepared by the polymerization of epoxides, such as ethylene oxide, propylene oxide, butylene oxide, tetrahydrofuran, styrene oxide or epichlorohydrin, with themselves or by addition of such epoxides, optionally in admixture or sequentially, to starting components with reactive hydrogen atoms, such as water, alcohols, ammonia or amines.

Among the above mentioned epoxides, ethylene oxide and propylene oxide are particularly preferred. Even more preferably, the polyether polyols employed are constituted only of propylene oxide as the epoxide component.

The contents stated above for PO relate to the (total) weight of the epoxides incorporated during the preparation of the polyether polyols. The weight of the starter molecules employed is left unconsidered.

If several epoxides are used for the synthesis of the polyether polyols, the latter can have any arrangement of the oxyalkylene moieties desired. Thus, they may correspondingly be homopolymers (if only one epoxide is used), copolymers, random copolymers, capped polymers or polymers tipped with a mixture of different epoxides to achieve a desired content of primary hydroxyl groups.

In contrast to WO 2007/085548 A1, the starter molecule of component (b) of the present invention is not derived from a renewable raw material.

"Renewable raw materials" within the meaning of the present invention means naturally occurring compounds that can also be isolated in this form.

"Not derived from a renewable raw material" within the meaning of the present invention means that the carbon skeleton of the respective renewable raw material is no longer contained within the polyether polyol of component (b). In particular, this means that said polyether polyol is not obtained, for example, by reacting a renewable raw material with epoxides to form a polyether polyol.

Examples of possible renewable raw materials include castor oil, polyhydroxyfatty acid, ricinoleic acid, oils modified with hydroxyl groups, such as grapeseed oil, black seed oil, pumpkin seed oil, borage seed oil, soybean oil, wheat germ oil, rapeseed oil, sunflower oil, peanut oil, apricot kernel oil, pistachio oil, almond oil, olive oil, macadamia nut oil, avocado oil, sea buckthorn oil, sesame oil, hemp oil, hazelnut oil, evening primrose oil, rose hip oil, safflower oil, walnut oil, fatty acids and fatty acid esters modified with hydroxyl groups based on myristoleinic acid, palmitoleinic acid, oleic acid, vaccenic acid, pertoselinic acid, gadoleinic acid, erucic acid, nervonic acid, linolic acid and linolenic acid, stearidonic acid, arachidonic acid, timnodonic acid, clupanodonic acid, cervonic acid.

The above mentioned renewable raw materials include chemically modified compounds in which, however, the carbon skeleton as such remains unaltered with respect to its connectivity (e.g., renewable raw materials modified with hydroxyl groups formed, e.g., by the hydroxylation of compounds or hydrogenated products).

Possible starter compounds include, for example, dicarboxylic acids, such as succinic acid, adipic acid, phthalic acid and terephthalic acid.

As further possible starter compounds, for example, ammonia or aliphatic and/or aromatic amines, which may optionally be substituted, such as N-monoalkyl, N,N-dialkyl and/or N,N'-dialkyl substituted diamines, may also be used. They have at least one primary or secondary amino group, such as 1,2-diaminoethane, oligomers of 1,2-diaminoethane (for example, diethylenetriamine, triethylenetetramine or pentaethylenehexamine), 1,3-diaminopropane, 1,3-diaminobutane, 1,4-diaminobutane, 1,2-diaminohexane, 1,3-diaminohexane, 1,4-diaminohexane, 1,5-diaminohexane, 1,6-diaminobenzene, 2,3-diaminotoluene, 2,4-diaminotoluene, 3,4-diaminotoluene, 2,5-diaminotoluene, 2,6-diaminotoluene, 2,2'-diaminodiphenylmethane, 2,4'-diaminodiphenylmethane, 4,4'-di-aminodiphenylmethane or aromatic amines obtained by acid-catalyzed condensation of aniline with formaldehyde. Further suitable starter molecules include alkanolamines, such as ethanolamine, N-methyl- and N-ethylethanolamine, dialkanolamines, such as diethanolamine, N-methyl- and N-ethyldiethanolamine, and trialkanolamines, such as triethanolamine.

Further suitable starter compounds are those having two or more hydroxyl groups, such as water, 1,2-ethanediol, 1,2-propanediol, 1,3-propanediol, di-ethylene glycol, dipropylene glycol, triethylene glycol, tripropylene glycol, 1,2-butanediol, 1,3-butanediol, 1,4-butanediol, 1,2-hexanediol, 1,3-hexanedioi, 1,4-hexanediol, 1,5-hexanediol, 1,6-hexanediol, glycerol, trimethylolpropane, pentaerythritol, sorbitol and sucrose, castor oil, modified soybean oil. The starter compounds may be used alone or as mixtures.

Preferably, the weight proportions of components (a) to (d) (optionally independently of one another) are as follows: (a) 32 to 54% by weight; (b) 16 to 27% by weight; (c) 11 to 19% by weight; and (d) 5 to 50% by weight. The indications in % by weight respectively relate to the total weight of the polyether polyol composition. These weight proportions are preferred because they result in a particularly high visco-elasticity in the polyurethane foam according to the invention.

It is particularly preferred to use a triol, especially glycerol, as a starter molecule in component (a). In the case of components (b) and (c), a 1,2-diol, preferably propylene glycol, is preferably used as a starter molecule.

In the case of component (d), castor oil and/or partially and/or completely hydrogenated castor oil, especially pharmaceutically refined castor oil (German Pharmacopoeia), is more particularly preferred as a renewable raw material.

In addition, it has been found particularly advantageous if the above described polyether polyol composition contains, in addition to components (a) to (d), a further component (e) which is a polyether polyol having a hydroxyl functionality of 2, an OH number within a range of from 505 to 525 mg of KOH/g and a PO content within a range of from 90 to 100% by weight.

Component (e) is preferably derived from a 1,2-diol, especially propylene glycol, as a starter molecule. Preferably, the proportion of component (e) in the polyether polyol composition is within a range of from 1 to 5% by weight.

In a second embodiment, the object of the invention is achieved by a process for preparing a visco-elastic foam characterized in that
(a) a polyether polyol composition according to any of claims 1 to 12;
(b) a polyisocyanate component;
(c) and optionally water, one or more catalysts;
are reacted optionally with the addition of further auxiliaries, fillers and/or foaming agents.

According to the invention, the term "water" in this context also includes water-releasing complexes, adducts and inclusion compounds. In this connection, free water is preferred, which may be contained in an amount within a range of from 0 to 10% by weight, preferably in an amount within a range of from 0.5 to 3% by weight, based on polyether polyol component B.

As said foaming agents to be optionally included, the foaming agents usually employed for the foaming of polyurethane foams are used. Examples of foaming agents are alkanes, such as n-pentane, iso-pentane, mixtures of iso- and n-pentanes, cyclopentane, cyclohexane, mixtures of butane isomers and the mentioned alkanes, halogenated compounds, such as dichloromethane, dichloromonofluoromethane, difluoromethane, trifluoromethane, difluoroethane, 1,1,1,2-tetrafluoroethane, tetrafluoroethane (R 134 and R 134a), 1,1,1,3,3,3-hexafluoropropane (R 356), 1,1,1,3,3-pentafluoropropane (R 245fa), chlorodifluoroethane, 1,1-dichloro-2,2,2-trifluoroethane, 2,2-dichloro-2-fluoroethane, heptafluoropropane and sulfur hexafluoride and carbon dioxide.

Preferably, carbon dioxide, cyclopentane, n-pentane and iso-pentane are employed singly or in admixture, optionally mixed with water. Further suitable foaming agents include carboxylic acids, such as formic acid, acetic acid, oxalic acid and chemical foaming agents that release gases in the course of the foaming process, such as azo compounds. Preferably, such foaming agents are employed in combination with water.

As said auxiliaries and additives to be optionally included, paraffins, paraffin oil, fatty alcohols or dimethylpolysiloxanes as well as pigments or dyes, stabilizers against ageing and weathering effects (such as octadecyl-3-(3,5-di-tert-butyl-4-hydroxyphenyl)propionate; aniline N-phenyl reaction products with 2,4,4-trimethylpentene; thiodiethylenebis[3-(3,5-di-tert-butyl-4-hydroxyphenyl)propionate]; tris(dipropylene glycol)phosphite; diisodecylphenyl phosphite; 2,6-di-tert-butyl-p-cresol), plasticizers (such as dioctyl phthalate, distearyl phthalate, diisodecyl phthalate, dioctyl adipate, tricresyl phosphate, triphenyl phosphate and others) as well as fungistatically and bacteriostatically active substances and fillers, such as barium sulfate, kieselguhr, carbon black, precipitated chalk, glass fibers, LC fibers, glass flakes, glass beads, aramide or carbon fibers may be included. Further examples of possible foam stabilizers, flame-retardant substances, surface-active substances and fillers can be found in US 2002/0165290 A1, especially in paragraphs [0033], [0034] and [0058]-[0062].

The auxiliaries and additives mentioned above may be admixed to one or more components and may also be inserted in a mold that is optionally employed.

For the preparation of the foams according to the invention, catalysts that accelerate the reaction between the polyol component B and the isocyanate component A are optionally employed. Examples of suitable catalysts include organotin compounds, such as tin(II) salts of organic carboxylic acids, for example, tin(II) acetate, tin(II) octoate, tin(II) ethylhexoate and tin(II) laurate, and the dialkyltin(IV) salts, for example, dibutyltin diacetate, dibutyltin dilaurate, dibutyl tin maleate and dioctyltin diacetate. Further examples of suitable catalysts include amidines, such as 2,3-dimethyl-2,4,5,6-tetrahydropyrimidines and amines, such as triethylamine, tributylamine, dimethylcyclohexylamine, dimethylbenzylamine, pentamethyldiethylenetriamine, N,N,N',N'-tetramethylbutanediamine and -ethanediamine, N-methylmorpholine, N-ethylmorpholine, N-cyclohexylmorpholine, N,N,N',N'-tetramethyl-1,6-hexanediamine, pentamethyldiethylenetriamine, tetramethylguanidine, tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, bis(dimethylaminoethyl)ether and tris(dialkylaminoalkyl)-s-hexa hydrotriazine. Preferably, the catalyst component contains at least one aliphatic amine.

Also, aminoalcohols may be used as catalysts. Examples thereof include triethanolamine, triisopropanolamine, N-methyl- and N-ethyldiethanolamine, and dimethylethanolamine and diethanolamines. N-(dimethylaminoethyl)-N-methylethanolamine is preferred.

A combination of several catalysts may also be used.

In the process according to the invention, the amount of polyisocyanate component is preferably selected to have an isocyanate characteristic number within a range of from 70 to 120, more preferably within a range of from 85 to 105, since a very good visco-elasticity of the foam obtained is achieved only within these narrow ranges.

"Isocyanate characteristic number" means the quotient of the number of isocyanate groups divided by the number of isocyanate-reactive groups, multiplied by 100. The isocyanate-reactive groups that may optionally be present in the foaming agents (carboxyl groups) are not included in the calculation of the isocyanate characteristic number.

In addition to (i.e., optionally in admixture with) "simple" polyisocyanate components, those obtained by a so-called prepolymerization of simple polyisocyanate components and organic compounds having at least one hydroxyl group may also be employed in the process according to the invention. Illustratively, there may be mentioned polyols or polyesters with one to four hydroxyl groups having molecular weights of from 60 to 6500. More preferably, those prepolymers which have been obtained by prepolymerization with the polyether polyol composition according to the invention are employed.

As the polyisocyanate component A, organic di- or polyisocyanates are used in the process according to the invention. As said di- or polyisocyanates, aliphatic, cycloaliphatic, araliphatic, aromatic and heterocyclic polyisocyanates as described in Justus Liebigs Annalen der Chemie 1949, 562, p. 75-136, may be used, for example, those of formula:

$Q(NCO)_n$ wherein $n$ is an integer of from 2 to 4, preferably 2; and

Q represents an aliphatic hydrocarbyl residue with from 2 to 18, preferably from 6 to 10, carbon atoms, a cycloaliphatic hydrocarbyl residue with from 4 to 15, preferably from 5 to 10, carbon atoms, an aromatic hydrocarbyl residue with from 8 to 15, preferably from 8 to 13, carbon atoms.

Polyisocyanates as described in DE-OS 28 32 253 are preferred. Polyisocyanates that are readily available technically, for example, 2,4- and 2,6-toluoylene diisocyanates and any mixtures of such isomers ("TDI"), polyphenyl polymethylene polyisocyanates as prepared by aniline-formaldehyde condensation followed by phosgenation ("MDI"), and polyisocyanates having carbodiimide groups, urethane groups, allophanate groups, isocyanurate groups, urea groups or biuret groups ("modified polyisocyanates"), especially those modified polyisocyanates which are derived from 2,4- and/or 2,6-toluoylene diisocyanate or from 4,4'- and/or 2,4'-diphenylmethane diisocyanate, are usually more preferably employed.

In particular, it has proven advantageous to employ TDI, wherein the proportion of the 2,4-isomer in the whole TDI (=sum of proportions of 2,4- and 2,6-isomers) is preferably within a range of from 50 to 100, more preferably within a range of from 60 to 85.

Especially TDI and the proportions as described above have proven particularly advantageous in view of the visco-elastic properties.

The polyurethane foams according to the invention are to be included in the above described class of foams whose visco-elasticity is based on the particular structure of the polyurethane components. Thus, this is not pneumatic visco-elasticity.

In a third embodiment, the object of the invention is achieved by a visco-elastic foam obtainable by the process described above. Bodies of this visco-elastic foam having any shape desired can be prepared in situ in a way, for example, by reaction injection molding, or by cutting or punching from accordingly prepared polyurethane foam slabstock.

In a fourth embodiment, the object of the invention is achieved by the use of a body made of the visco-elastic foam according to the invention in mattresses, pillows, seat covers, soles of shoes, earplugs, protective clothing, protective equipment or sound insulations.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

In a conventional slabstock foam machine, the following polyether polyol composition:

| | |
|---|---|
| polyol (a) | 42 weight parts |
| polyol (b) | 21 weight parts |
| polyol (c) | 15 weight parts |
| castor oil (d) | 20 weight parts |
| polyol (e) | 2 weight parts | with the addition of 1.36 weight parts of water,
with the addition of the following auxiliaries

| | |
|---|---|
| Tegostab ® BF2370 | 0.60 weight parts |
| Addocat ® 108 catalyst | 0.155 weight parts |
| Addocat ® 105 catalyst | 0.50 weight parts |
| urea | 0.30 weight parts |
| with the use of | |
| Desmodur ® T65 | 37.3 weight parts | as the polyisocyanate component was used to prepare a polyurethane foam according to the invention having the following physical properties:

| | |
|---|---|
| bulk density (according to DIN EN ISO 3386-1-98): | 58.5 kgm$^{-3}$ |
| tensile strength (according to DIN EN ISO 1798): | 59 kPa |
| elongation at break (according to DIN EN ISO 1798): | 218% |
| compression hardness 40% (4th loading): | 1.63 kPa |
| compression hardness 40% (37° C., 1st loading): | 2.26 kPa |
| wet compression set (according to DIN EN ISO 1856-96): | |
| 22 h; 40° C.; 95% humidity: | 6.9% |
| rebound elasticity: | 4% |

Polyol (a) was a polyether polyol having an OH number of 233 and a PO content of 100%. Glycerol was used as the starter molecule for preparing polyol (a).

Polyol (b) was a polyether polyol having an OH number of 56 and a PO content of 100%. Propylene glycol was used as the starter molecule for preparing polyol (b).

Polyol (c) was a polyether polyol having an OH number of 112 and a PO content of 100%. Propylene glycol was used as the starter molecule for preparing polyol (c).

Polyol (e) was a polyether polyol having an OH number of 512 and a PO content of 100%. Propylene glycol was used as the starter molecule for preparing polyol (e).

Pharmaceutically refined castor oil (German Pharmacopoeia) was used as the renewable raw material (d). It was purchased from the Alberdingk Boley GmbH.

Polyols (a), (b), (c) and (e) and the Desmodur® isocyanates were obtained from Bayer MaterialScience AG, Tegostab stabilizer was obtained from Evonik Goldschmidt GmbH, and the Addocat® catalysts were obtained from the Rhein Chemie Rheinau GmbH.

The urea employed was of technical grade.

The invention claimed is:

1. A polyether polyol composition for use in preparing visco-elastic polyurethane foams, comprising:
   (a) a polyether polyol having a hydroxyl functionality of 3, an OH number in the range of from 210 to 255 mg of KOH/g and a PO content in the range of from 90 to 100% by weight;
   (b) a polyether polyol whose polyol starting molecule is not derived from a renewable raw material, having a hydroxyl functionality of 2, an OH number in the range of from 41 to 71 mg of KOH/g and a PO content in the range of from 90 to 100% by weight;
   (c) a polyether polyol having a hydroxyl functionality of 2, an OH number in the range of from 92 to 132 mg of KOH/g and a PO content in the range of from 90 to 100% by weight; and
   (d) at least one renewable raw material wherein each molecule of raw material has at least one free OH group wherein the proportion of (d) in said polyether polyol composition is in the range of from 5 to 50% by weight.

2. The composition of claim 1, wherein the proportion of (a) in said polyether polyol composition is in the range of from 32 to 54% by weight.

3. The composition of claim 1, wherein the proportion of (b) in said polyether polyol composition is in the range of from 16 to 27% by weight.

4. The composition of claim 1, wherein the proportion of (c) in said polyether polyol composition is in the range of from 11 to 19% by weight.

5. The composition of claim 1, wherein said polyether polyol of (a) is derived from glycerol as the starter molecule.

6. The composition of claim 1, wherein said polyether polyol of (b) is derived from propylene glycol as the starter molecule.

7. The composition of claim 1, wherein said polyether polyol of (c) is derived from propylene glycol as the starter molecule.

8. The composition of claim 1, wherein said renewable raw material of (d) comprises castor oil and/or partially and/or completely hydrogenated castor oil.

9. The composition of claim 1, further comprising (e) a polyether polyol having a hydroxyl functionality of 2, an OH number in the range of from 450 to 550 mg of KOH/g and a PO content in the range of from 90 to 100% by weight.

10. The composition of claim 9, wherein said polyether polyol of (e) is derived from propylene glycol as the starter molecule.

11. The composition of claim 9, wherein the proportion of (e) in said polyether polyol composition is in the range of from 1 to 5% by weight.

12. A process for preparing a visco-elastic foam comprising reacting
   (a) a polyether polyol composition comprising:
      (i) a polyether polyol having a hydroxyl functionality of 3, an OH number in the range of from 210 to 255 mg of KOH/g and a PO content in the range of from 90 to 100% by weight;
      (ii) a polyether polyol whose polyol starting molecule is not derived from a renewable raw material, having a hydroxyl functionality of 2, an OH number in the range of from 41 to 71 mg of KOH/g and a PO content in the range of from 90 to 100% by weight;
      (iii) a polyether polyol having a hydroxyl functionality of 2, an OH number in the range of from 92 to 132 mg of KOH/g and a PO content in the range of from 90 to 100% by weight; and
      (iv) at least one renewable raw material wherein each molecule of raw material has at least one free OH group;
   (b) a polyisocyanate component; and
   (c) optionally water and one or more catalysts;
   and optionally further auxiliaries, fillers, and/or foaming agents.

13. The process of claim 12, wherein the amount of polyisocyanate component is selected to have an isocyanate characteristic number within a range of from 70 to 120.

14. The process of claim 13, wherein the amount of polyisocyanate component is selected to have an isocyanate characteristic number within a range of from 85 to 105.

15. The process of claim 12, wherein a polyisocyanate component obtained by prepolymerization is employed.

16. The process of claim 15, wherein a polyether polyol composition comprising:
   (a) a polyether polyol having a hydroxyl functionality of 3, an OH number in the range of from 210 to 255 mg of KOH/g and a PO content in the range of from 90 to 100% by weight;
   (b) a polyether polyol whose polyol starting molecule is not derived from a renewable raw material, having a hydroxyl functionality of 2, an OH number in the range of from 41 to 71 mg of KOH/g and a PO content in the range of from 90 to 100% by weight;
   (c) a polyether polyol having a hydroxyl functionality of 2, an OH number in the range of from 92 to 132 mg of KOH/g and a PO content in the range of from 90 to 100% by weight; and
   (d) at least one renewable raw material wherein each molecule of raw material has at least one free OH group
   is employed in said prepolymerization.

17. A visco-elastic foam prepared by the process of claim 12.

18. A shaped body comprising the visco-elastic foam of claim 17.

19. A mattress, pillow, seat cover, shoe sole, earplug, protective clothing, protective equipment, or sound insulation comprising the visco-elastic foam of claim 18.

* * * * *